US009143704B2

(12) United States Patent
Lin

(10) Patent No.: US 9,143,704 B2
(45) Date of Patent: Sep. 22, 2015

(54) IMAGE CAPTURING DEVICE AND METHOD THEREOF

(71) Applicant: HTC Corporation, Taoyuan County (TW)

(72) Inventor: Chun-Ta Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 358 days.

(21) Appl. No.: 13/688,217

(22) Filed: Nov. 29, 2012

(65) Prior Publication Data
US 2013/0188057 A1    Jul. 25, 2013

Related U.S. Application Data

(60) Provisional application No. 61/588,667, filed on Jan. 20, 2012.

(51) Int. Cl.
*H04N 5/33* (2006.01)

(52) U.S. Cl.
CPC . *H04N 5/33* (2013.01); *H04N 5/332* (2013.01)

(58) Field of Classification Search
CPC ........... H04N 5/33; H04N 5/332; H04N 3/09; G01J 5/52; G01J 5/02; G01J 2005/0077
See application file for complete search history.

(56) References Cited

U.S. PATENT DOCUMENTS

| 7,728,316 | B2 | 6/2010 | Fadel et al. |
| 7,812,827 | B2 | 10/2010 | Hotelling et al. |
| 7,916,941 | B2 | 3/2011 | Christie |
| 8,008,613 | B2 | 8/2011 | Tam |
| 8,217,336 | B2 | 7/2012 | Tam |
| 2005/0285966 | A1 | 12/2005 | Bamji et al. |
| 2007/0279514 | A1* | 12/2007 | Mitsumine et al. ........... 348/336 |
| 2008/0297487 | A1 | 12/2008 | Hotelling et al. |
| 2009/0273679 | A1 | 11/2009 | Gere et al. |
| 2010/0103268 | A1* | 4/2010 | Tokuyama .................... 348/162 |

(Continued)

FOREIGN PATENT DOCUMENTS

| CN | 1310915 | 8/2001 |
| CN | 1794783 | 6/2006 |

(Continued)

OTHER PUBLICATIONS

"Office Action of Chinese Counterpart Application", issued on Sep. 10, 2014, p. 1-p. 10.

*Primary Examiner* — William C Vaughn, Jr.
*Assistant Examiner* — Eileen Adams
(74) *Attorney, Agent, or Firm* — Jianq Chyun IP Office

(57) ABSTRACT

An image capturing device and a method thereof are provided. The image capturing device includes an image sensor and a processor. The image sensor includes a color filter array and a sensor chip. The color filter array includes a first region permitting visible light and infrared light to pass and a second region permitting the infrared light to pass. The sensor chip obtains a target image through the color filter array, wherein the target image includes a composite image corresponding to the first region and a first group infrared image corresponding to the second region, and the composite image includes a second group infrared image, where the second group infrared image and the first group infrared image are linear correlated. The processor adjusts a proportion of the second group infrared image in the composite image by employing the first group infrared image, so as to generate a processed image.

13 Claims, 9 Drawing Sheets

(56) References Cited

U.S. PATENT DOCUMENTS

| | | |
|---|---|---|
| 2010/0289885 A1 | 11/2010 | Lu et al. |
| 2011/0074931 A1 | 3/2011 | Bilbrey et al. |
| 2011/0090351 A1 | 4/2011 | Cote et al. |
| 2011/0164146 A1* | 7/2011 | Chiang et al. ............... 348/229.1 |
| 2011/0181955 A1* | 7/2011 | Cho et al. ....................... 359/555 |
| 2011/0235017 A1* | 9/2011 | Iwasaki ........................ 356/4.01 |
| 2012/0026368 A1 | 2/2012 | Cote et al. |

FOREIGN PATENT DOCUMENTS

| | | |
|---|---|---|
| CN | 102075683 | 5/2011 |
| WO | 2010141772 | 12/2010 |
| WO | 2011131758 | 10/2011 |

* cited by examiner

IMAGE CAPTURING DEVICE AND METHOD THEREOF

CROSS-REFERENCE TO RELATED APPLICATION

This application claims the priority benefits of U.S. provisional application Ser. No. 61/588,667, filed on Jan. 20, 2012. The entirety of the above-mentioned patent application is hereby incorporated by reference herein and made a part of this specification.

TECHNICAL FIELD

The invention relates to an image capturing device and a method thereof, and more particularly, to an image capturing device capable of adjusting a content of an infrared (IR) image signal and a method thereof.

BACKGROUND

In recent years, the development of digital cameras has been progressed rapidly, so that the digital cameras have become one of the most indispensable parts of our daily life. Therefore, enhancing the image quality has always been one of the essential topics in the industry fields. In brief, photography is utilized light to irradiate on an object, and after the light is reflected and passed though a lens of a digital camera, an image processing is subsequently performed inside the digital camera. However, the light can further include a non-visible light such as an infrared (IR) light or an ultraviolet light besides the visible light. The current techniques are mostly employed optical filters to filter out the infrared light or adjust the light entering the inside of the digital camera.

FIG. 1 is a schematic diagram illustrating an existing image sensor which receives light and a color filter array thereof in a digital camera. Referring to FIG. 1, the image sensor 10 includes a lens 110, a color filter array 120 and a sensor chip 130, in which the color filter array 120 is formed by a plurality of sub-pixel arrays arranged in an array. For example, the sub-pixel array 122 is arranged in Bayer pattern. Moreover, an infrared cut filter 20 is further included, and is disposed above the image sensor 10.

Generally speaking, the infrared cut filter 20 has to be used to filter out the infrared light when a sufficient light source is provided. If the image sensor 10 receives an infrared signal, the image processing such as performing color calculation and automatic white balance (AWB) can be easily interfered by the infrared signal and the errors are caused in the calculation, so that there is a great difference between the color appeared form the image and the color seen by human eyes. However, the image sensor 10 can only increase the brightness through a flash lamp when an insufficient light source is provided, but the effect from the flash lamp tends to cause an unnatural feeling to the user with regard to the image quality.

SUMMARY

Accordingly, the invention is directed to an image capturing device, which is capable of adjusting a proportion of an infrared image in an outputting composite image by a single image sensor.

The invention is directed to an image capturing method, which is cooperated with an auto exposure control to set an infrared adjustment factor, and is capable of adjusting a content of an infrared signal in an output image.

The invention provides an image capturing device including an image sensor and a processor, in which the image sensor includes a color filter array and a sensor chip. The color filter array includes a first region which permits visible light and infrared light to pass and a second region which permits the infrared light to pass. The sensor chip obtains a target image through the color filter array, in which the target image includes a composite image corresponding to the first region and a first group infrared image corresponding to the second region, in which the composite image includes a second group infrared image, and the second group infrared image and the first group infrared image are linear correlated. The processor adjusts a proportion of the second group infrared image in the composite image by employing the first group infrared image, so as to generate a processed image.

The invention provides an image capturing method which is applicable to an image capturing device. The image capturing method includes the following steps. A target image is obtained by the image capturing device, and a proportion of a second group infrared image in a composite image is adjusted by employing a first group infrared image so as to generate a processed image, in which the step of obtaining the target image includes: receiving light by a color filter array, so that visible light and infrared light pass through a first region of the color filter array and the infrared light passes through a second region of the color filter array; and generating a composite image corresponding to the first region and a first group infrared image corresponding to the second region by a sensor chip, in which the composite image includes a second group infrared image, and the second group infrared image and the first group infrared image are linear correlated.

Based on the above, in the image capturing device and the method thereof provided by the invention, by removing the infrared cut filter and cooperating with the dyestuffs that can sense the infrared light in the color filter array, the infrared signal is obtained. Moreover, by cooperating with the auto exposure control, the infrared adjustment factor is set, and the proportion of the infrared image in the outputting composite image can be adjusted.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

The invention is to prevent the need to consider whether to use an infrared cut filter when a user uses a digital camera to capture an image depending upon the brightness in an environment. The invention provides an image capturing device, which can adjust a proportion of an infrared image in an output image at any time according to an ambient brightness, under the conditions that no infrared cut filter is used and only a single image sensor is employed. Below, exemplary embodiments will be described in detail with reference to accompanying drawings so as to be easily realized by a person having ordinary knowledge in the art. The inventive concept may be embodied in various forms without being limited to the exemplary embodiments set forth herein.

Figure 1:
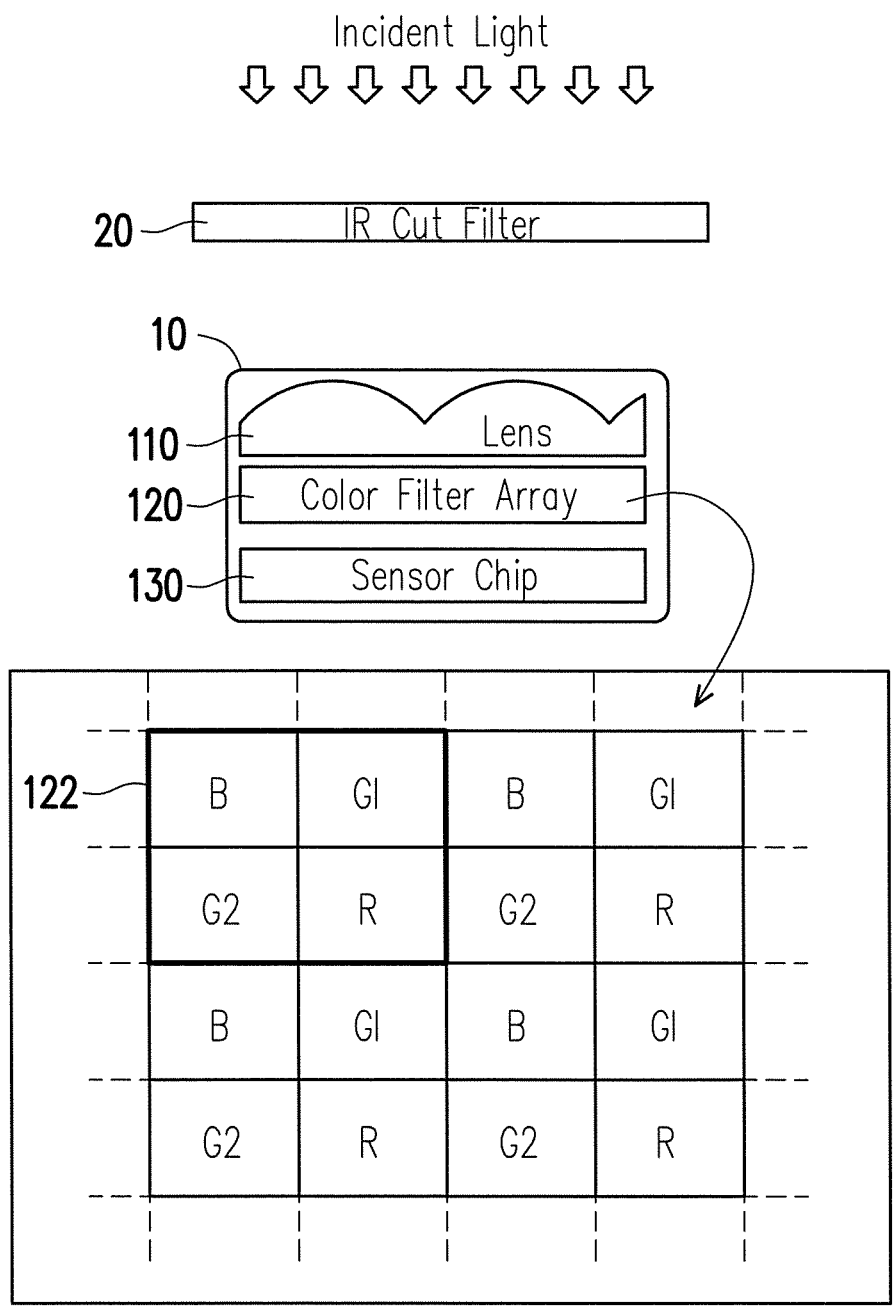
FIG. 1 is a schematic diagram illustrating an existing image sensor which receives light and a color filter array thereof in a digital camera.
Figure 2:
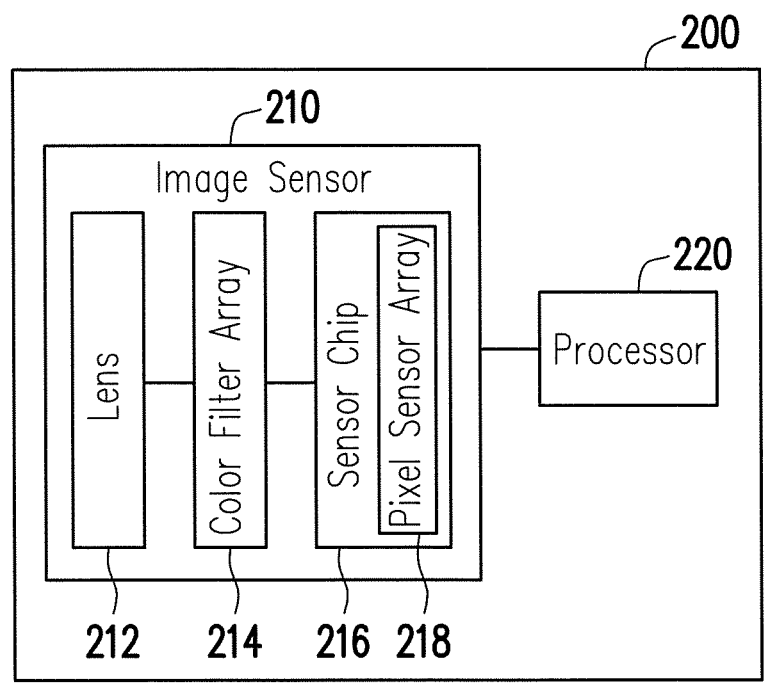
FIG. 2 is a block diagram illustrating an image capturing device according to an embodiment of the invention.

FIG. 2 is a block diagram illustrating an image capturing device according to an embodiment of the invention. Referring to FIG. 2, in the present embodiment, an image capturing device 200 can be a digital camera, a digital single lens reflex camera (DSLR), or a digital video camcorder (DVC), although the invention is not limited thereto. The image capturing device 200 includes an image sensor 210 and a processor 220 coupled to the image sensor 210, and functions thereof are respectively described as below.

More specifically, in the present embodiment, the image sensor 210 includes a lens 212, a color filter array 214 and a sensor chip 216, for instance. The sensor chip 216 further includes a pixel sensor array 218. In the present embodiment, the lens 212 and the pixel sensor array 218 are disposed at two sides of the color filter array 214, respectively. First, the light incident through the lens 212 is filtered by the color filter array 214, so that the specific visible light and infrared light can pass. Then, the sensor chip 216 senses a light intensity by the pixel sensor array 218, and obtains a target image after converting an analog image signal into a digital image signal. The processor 220 further performes a digital image processing on the target image so as to obtain a processed image, in which the color filter array 214 includes a plurality of filter blocks, and arrangements thereof will be further described as below.

The processor 220 can be a central processing unit (CPU), or other programmable microprocessors with general purpose or special purpose, a digital signal processor (DSP), a programmable controller, an application specific integrated circuit (ASIC), or other similar devices, or a combination thereof.

Figure 3:
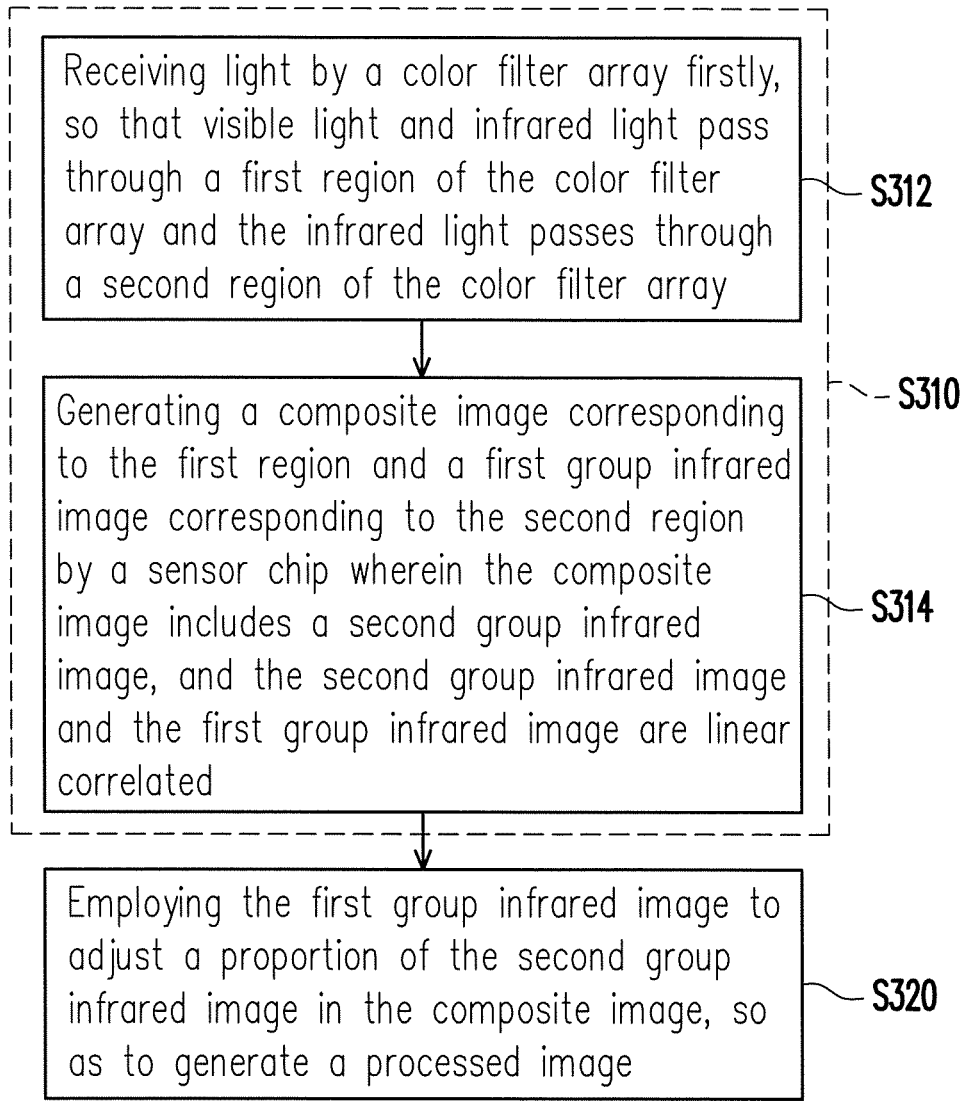
FIG. 3 is a flowchart diagram illustrating an image capturing method according to an embodiment of the invention.

FIG. 3 is a flowchart diagram illustrating an image capturing method according to an embodiment of the invention. The method of the present embodiment is applicable to the image capturing device 200 depicted in FIG. 2. Hereinafter, the image capturing method of the present embodiment will be described in detail accompanying with reference to each element of the image capturing device 200.

First, in step S310, a target image is obtained by an image capturing device, in which step S310 can be further divided into two sub-steps S312 and S314. Specifically, the method of obtaining the target image includes the following steps. First, light is received by a color filter array, so that the visible light and the infrared light pass through a first region of the color filter array 214, and the infrared light passes through a second region of the color filter array 214. In order to illustrate the difference between the first region and the second region of the color filter array 214, the operation of the image capturing device 200 will be described with reference to FIG. 4.

Figure 4:
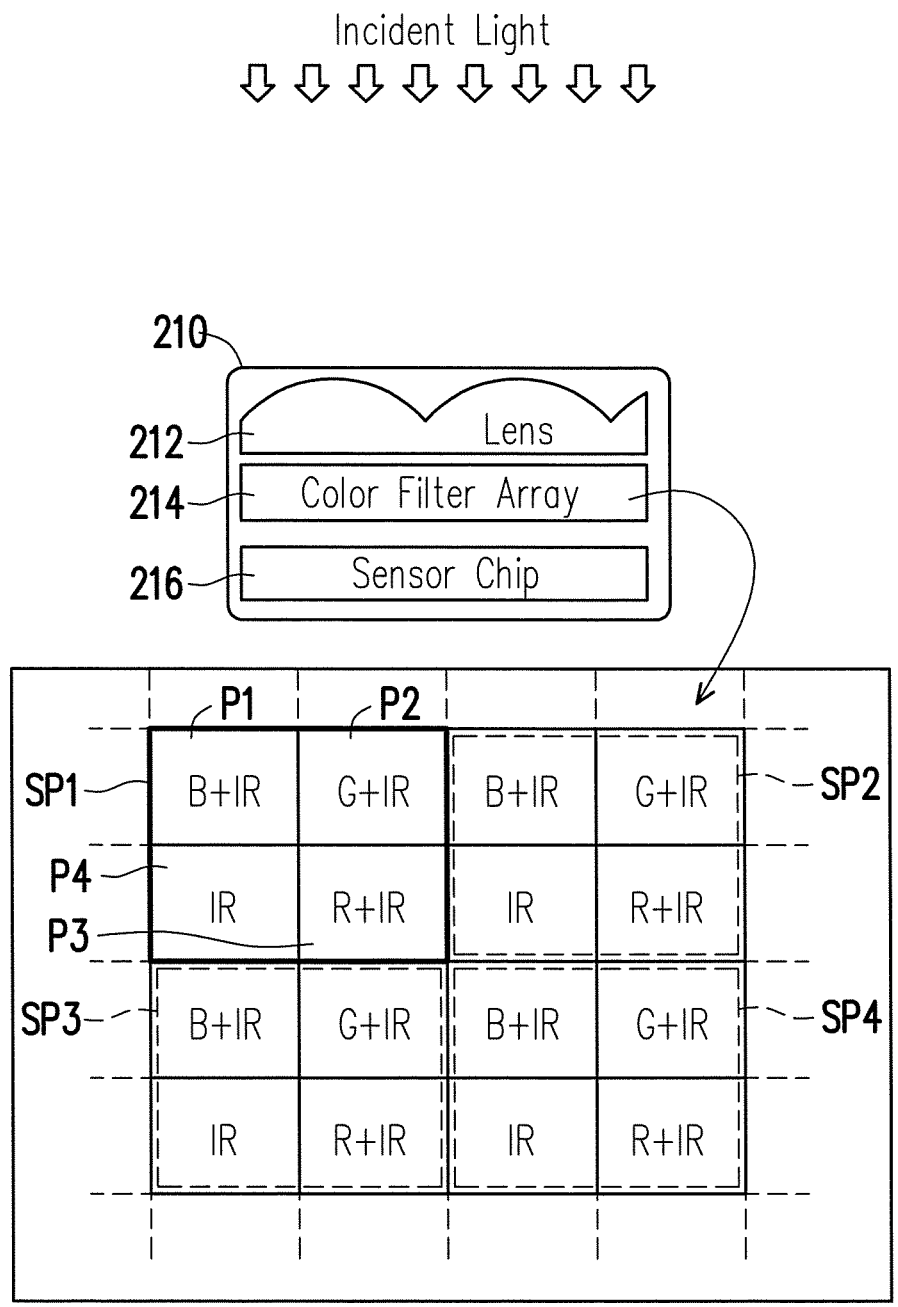
FIG. 4 is a schematic diagram illustrating an image sensor 210 which receives light and a color filter array 214 thereof according to an embodiment of the invention.

FIG. 4 is a schematic diagram illustrating an image sensor 210 which receives light and a color filter array 214 thereof according to an embodiment of the invention. As shown in FIG. 4, in the present embodiment, no infrared cut filter is disposed above the image sensor 210, such that the visible light and the infrared light can both enter inside the image sensor 210. The color filter array 214 includes a plurality of filter blocks, and each of the filter blocks includes a plurality of filtering units. In FIG. 4, only filter blocks SP1, SP2, SP3 and SP4 are illustrated in the color filter array 214. Since each of the filter blocks has the same structure, only the filter block SP1 is taken as an example to illustrate in the following description.

The filter block SP1 includes a first filtering unit P1, a second filtering unit P2, a third filtering unit P3 and a fourth filtering unit P4. Each of the filtering units permits the light having various frequency bands to pass, respectively, and is arranged in a repeating pattern. Moreover, each of the filtering units respectively corresponds to one of the pixel sensors in the pixel sensor array in space.

Specifically, for instance, the first filtering unit P1 includes a first dyestuff capable of simultaneously sensing the blue light and the infrared light, so that the blue light and the infrared light enter to the corresponding pixel sensors, thereby sensing and obtaining a first image signal (B+IR). The second filtering unit P2 includes a second dyestuff capable of simultaneously sensing the green light and the infrared light, so that the green light and the infrared light enter to the corresponding pixel sensors, thereby sensing and obtaining a second image signal (G+IR). The third filtering unit P3 includes a third dyestuff capable of simultaneously sensing the red light and the infrared light, so that the red light and the infrared light enter to the corresponding pixel sensors, thereby sensing and obtaining a third image signal (R+IR). The fourth filtering unit P4 includes a fourth dyestuff configured specifically to sense the infrared light, so that the infrared light enters to the corresponding pixel sensor, thereby sensing and obtaining a fourth image signal IR.

Based on the above, in the exemplary embodiment, the first region of the color filter array 214 includes the regions corresponding to the first filtering unit P1, the second filtering unit P2 and the third filtering unit P3 in each of the filter blocks. The second region of the color filter array 214 includes the regions corresponding to the fourth filtering unit P4 in each of the filter blocks. Thus, the composite image includes the first image signal (B+IR), the second image signal (G+IR) and the third image signal (R+IR) in each of filter blocks, and the first group infrared image includes the fourth image signal IR in each of filter blocks. It should be noted that, the second group infrared image in the composite image and the first group infrared image appear to be linear correlated.

Back to FIG. 3, in step S312, the filtering units in the first region of the color filter array 214 are utilized firstly, so that the visible light and the infrared light pass through the color filter array 214 simultaneously. Then, the filtering units in the second region are utilized, so that the infrared light passes through the color filter array 214. Next, in step S314, the composite image corresponding to the first region and the first group infrared image corresponding to the second region are respectively sensed by the pixel sensor array 218 in the sensor chip 216. The composite image and the first group infrared image are combined to generate the target image.

Next, in step S320, the processor 220 employs the first group infrared image to adjust the proportion of the second group infrared image in the composite image, so as to generate the processed image. In brief, the composite image is composed of a red green blue (RGB) image and the second group infrared image. The second group infrared image and the first group infrared image are linear correlated, and accordingly, the processor 220 can adjust the proportion of the second group infrared image in the composite image.

For example, under the normal mode with a sufficient ambient light source, the infrared image causes a great difference between the color appeared form the image and the color seen by human eyes. Therefore, the processor 220 can employ the first group infrared image to retrieve the RGB image from the composite image so as to serve as the processed image. By contrast, under the glimmer mode with an insufficient ambient light source, the image brightness is increased by the infrared image so as to enhance the image quality. Thus, the processor 220 employs the first group infrared image to adjust the proportion of the second group infrared image in the composite image so as to generate the processed image. More specifically, the processor 220 can progressively increase the proportion of the second group infrared image in the composite image as the ambient brightness gradually decreases.

Accordingly, in the invention, the light having various frequency bands can be controlled by the arrangement of each filtering unit in the color filter array 214, such that the image capturing device of the invention can adjust the proportion of the infrared image in the output image according to the variation of the ambient light source (brightness). Additionally, it should be noted that, in the exemplary embodiment, the arrangement for each of the filtering units depicted in FIG. 4 is only one of the embodiments, although the invention is not limited thereto. According to requirements in practice, people skilled in the art may arrange the locations of the first filtering unit P1~the fourth filtering unit P4 except that every filtering unit has to be arranged in the same way in each of the filter blocks.

The description that the processor employs the first group infrared image to adjust the proportion of the second infrared image in the composite image so as to generate an adequate processed image, which is further explained below.

Figure 5:
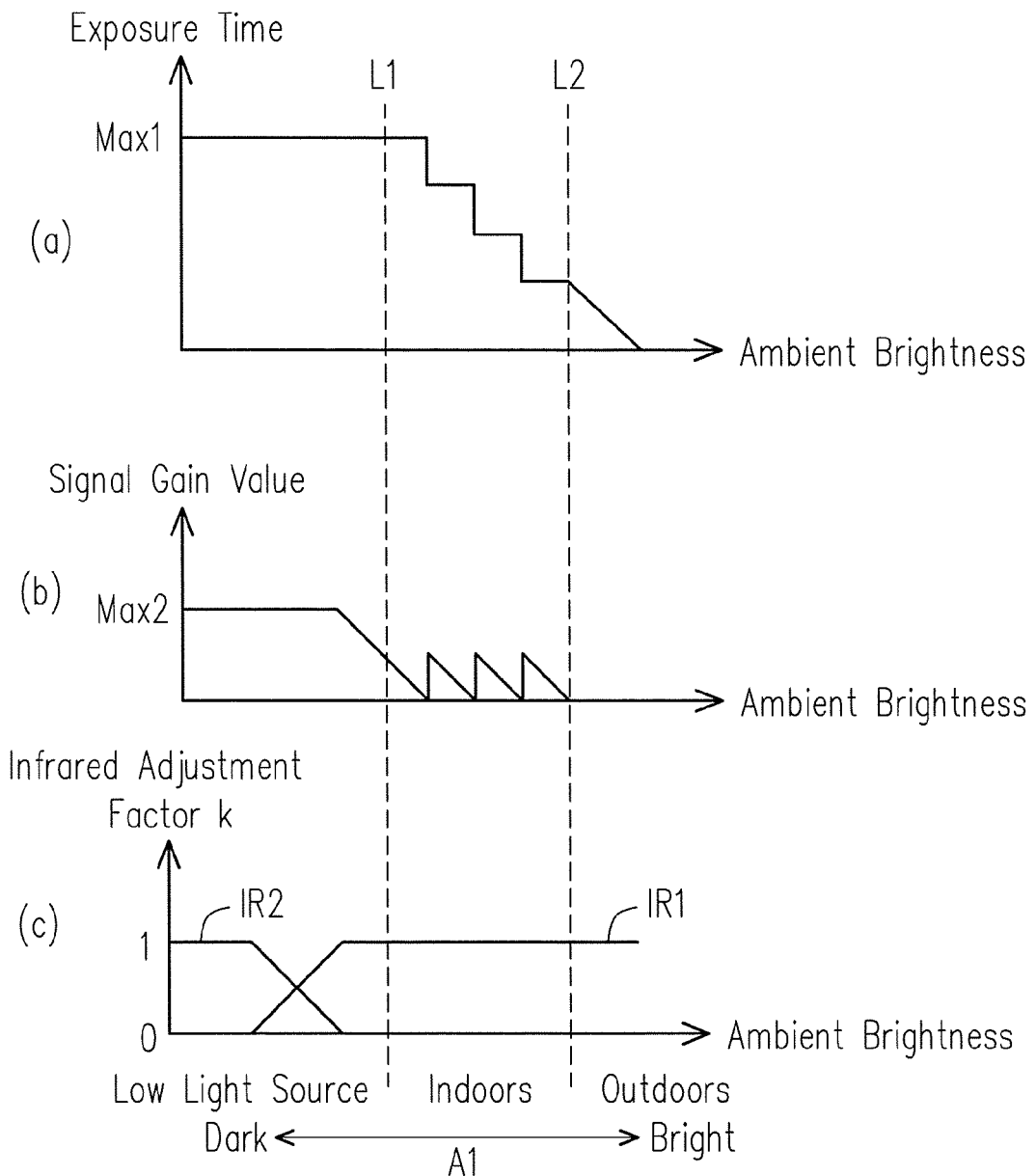
FIG. 5 is a schematic diagram illustrating an auto exposure control according to an embodiment of the invention.

Here, the relationships of the exposure time and the signal gain value of the image capturing device are illustrated firstly. FIG. 5 is a schematic diagram illustrating an auto exposure control according to an embodiment of the invention. Referring to FIG. 5, FIG. 5(a) is a diagram illustrating the relationship between the exposure time of the image capturing device and the ambient brightness, in which the horizontal axis represents the ambient brightness, and the vertical axis represents the exposure time. FIG. 5(b) is a diagram illustrating the relationship between the signal gain value of the image capturing device and the ambient brightness, in which the horizontal axis represents the ambient brightness, and the vertical axis represents the signal gain value. FIG. 5(c) is a diagram illustrating the relationship between the infrared adjustment factor and the ambient brightness, in which the horizontal axis represents the ambient brightness, and the vertical axis represents the infrared adjustment factor. The ambient brightness can be separated into three categories of brightness by the separating lines L1 and L2, which respectively are outdoors, indoors and low light source.

Next, referring to FIG. 5(a) and FIG. 5(b), when the ambient brightness belongs to the outdoors category, the exposure time is shorter and the signal gain value is zero due to sufficient light, and the exposure time increases linearly as the ambient brightness weakens (i.e., the direction indicated by the arrow A1 such as toward left-hand side). When the ambient brightness belongs to the indoors category, the signal gain value is adjusted as the exposure time increases in a step function manner. Until the exposure time is set to be a maximum value Max1, the signal gain value begins to increase linearly from zero to a maximum value Max2. Based on the above, the image sensor can base on the difference in the ambient brightness, and accordingly, adjust the exposure time and the signal gain value. Therefore, under the normal mode with the ambient brightness belonging to the outdoors/indoors category, the image sensor can adjust the brightness of the processed image through the exposure time and the signal gain value, without adjusting the proportion of the second group infrared image in the composite image through the first group infrared image.

Moreover, for example, the invention can adjust the proportion of the second group infrared image in the composite image by setting the infrared adjustment factor k. Referring to FIG. 5(c), when the exposure time of the image sensor reaches the maximum value Max1 (i.e., a first predetermined value) and the signal gain thereof reaches the maximum value Max2 (i.e., a second predetermined value), one of a first linear function IR1 and a second linear function IR2 can be selected as the ambient brightness gradually decreases, so that the infrared adjustment factor k is linearly adjusted from a first designated value to a second designated value, in which the first and second linear functions IR1 and IR2 are applicable to various embodiments.

The processor can adjust to generate the processed image $Img_{R,G,B}(k)$ according to the following formula:

$$Img_{R,G,B}(k)=R+IR(k)+G+IR(k)+B+IR(k), \text{ where } 0 \leq k \leq 1.$$

With reference to FIG. 5, when the exposure time of the image sensor reaches the maximum value Max1 and the signal gain value thereof reaches the maximum value Max2, the processor linearly and gradually decreases the infrared adjustment factor k from 1 (i.e., the first designated value) to zero (i.e., the second designated value) as the ambient brightness gradually decreases. In other words, the processor of the present embodiment is applicable to the first linear function IR1 so as to adjust the infrared adjustment factor k.

Based on the above, in the invention, the proportion of the second group infrared image in the composite image can be adjusted by only implementing the single image sensor.

Figure 6:
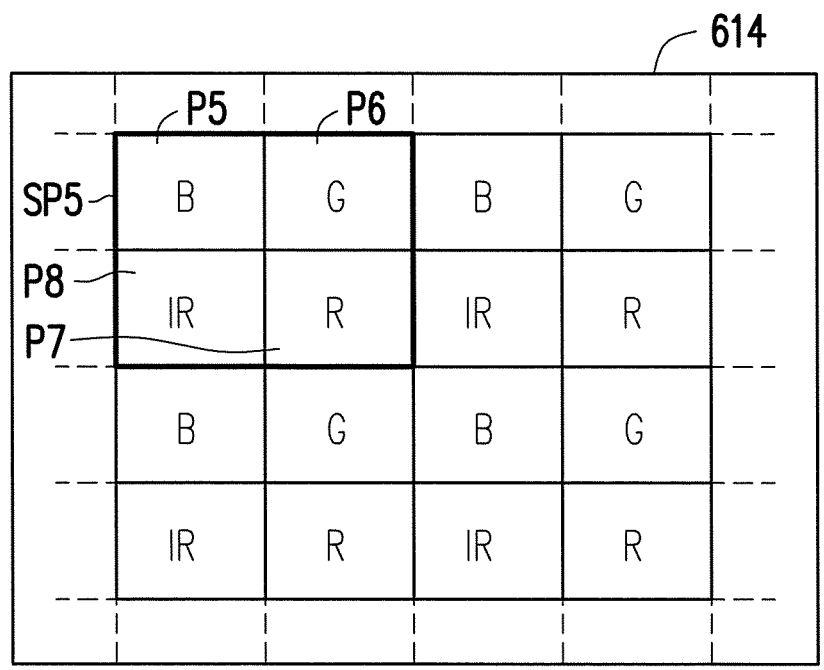
FIG. 6 is a schematic diagram illustrating a color filter array according to another embodiment of the invention.

The description that the second linear function IR2 is employed to adjust the infrared adjustment factor k in another embodiment, which is further explained below. FIG. 6 is a schematic diagram illustrating a color filter array according to another embodiment of the invention. Similarly, the color filter array 614 is formed by a plurality of filter blocks arranged in an array, and each of the filter blocks includes a plurality of filtering units. Taking a filter block SP5 as an example, the first filtering unit P5 includes a first dyestuff capable of sensing the blue light, so that the sensor chip senses and obtains a first image signal B. The second filtering unit P6 includes a second dyestuff capable of sensing the green light, so that the sensor chip senses and obtains a second image signal G. The third filtering unit P7 includes a third dyestuff capable of sensing the red light, so that the sensor chip senses and obtains a third image signal R. The fourth filtering unit P8 includes a fourth dyestuff capable of sensing the infrared light, so that the sensor chip senses and obtains a fourth image signal IR.

When the color filter array 214 depicted in FIG. 4 is replaced by the color filter array 614 depicted in FIG. 6 and the other conditions remain the same as above, the processor 220 can adjust the composite image to generate the processed image $Img_{B,G,R,IR}(k)$ according to the following formula:

$$Img_{B,G,R,IR}(k)=R+G+B+IR(k), \text{ where } 0\leq k\leq 1.$$

Similarly, the processor can set the infrared adjustment factor k according to the exposure time and the signal gain value of the image sensor. In other words, the processor is applicable to the second linear function IR2 depicted in FIG. 5(c) so as to set the infrared adjustment factor k. Specifically, when the exposure time of the image sensor reaches the maximum value Max1 and the signal gain value thereof reaches the maximum value Max2, the processor 220 can linearly and gradually increase the infrared adjustment factor k from zero (i.e., the first designated value) to 1 (i.e., the second designated value) as the ambient brightness gradually decreases.

Figure 7A:
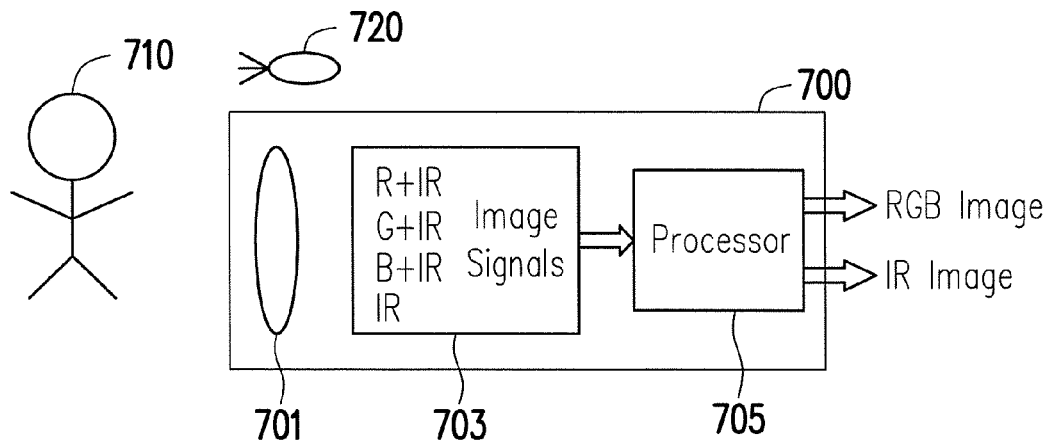
FIG. 7(a) is a schematic diagram illustrating an application scenario according to another embodiment of the invention.
Figure 7B:
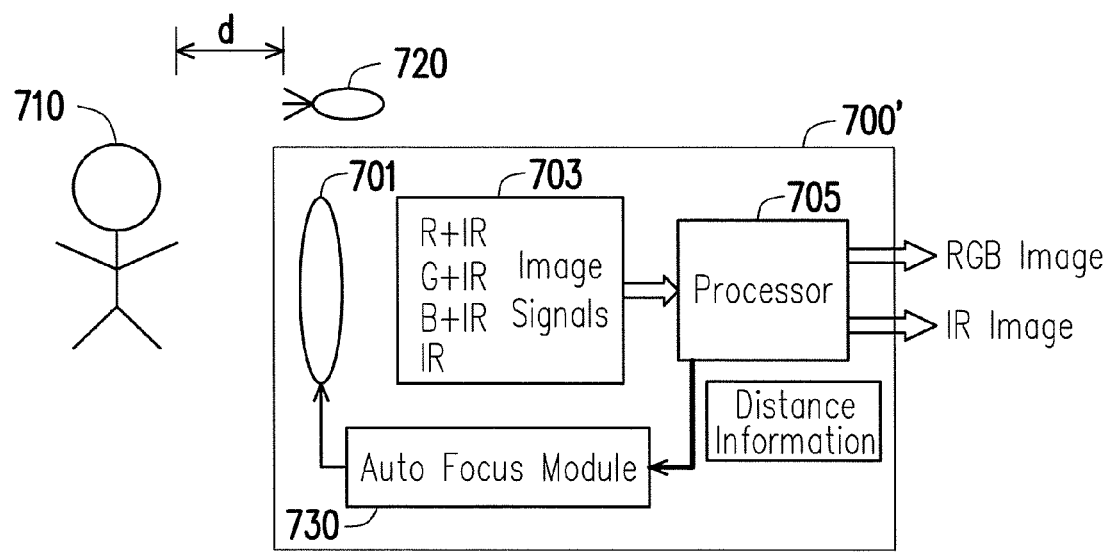
FIG. 7(b) is a schematic diagram illustrating another application scenario according to another embodiment of the invention.

The image capturing device of the invention can be implemented as follow. FIG. 7(a) is a schematic diagram illustrating an application scenario according to another embodiment of the invention. FIG. 7(b) is a schematic diagram illustrating another application scenario according to another embodiment of the invention.

Referring to FIG. 7(a), when the image capturing technique of the invention is implemented to capture an object 710, under the condition of capturing at nighttime or other ambient brightness being insufficient, the infrared light source 720 can be added to enhance the ambient brightness during capturing and to increase the reflected light of the object 710 entering to the lens 701 of the image capturing device 700. The image sensor 703 of the image capturing device 700 is configured to sense and generate four different image signals which are (R+IR), (G+IR), (B+IR) and IR. After being processed by the processor 705, the composite image (i.e., the RGB image) and the infrared image (i.e., the IR image) can be generated simultaneously.

Referring to FIG. 7(b), the application scenario depicted in FIG. 7(b) is similar to FIG. 7(a) except that the image capturing device 700' of the present embodiment further includes an auto focus module 730, so that the implementation of auto-focus (AF) can be executed. After the composite image and the infrared image are generated, the processor 705 of the present embodiment can further utilize the infrared image to execute image recognition, so as to detect a distance d between the lens 701 and the object 710; or the processor 705 can inquire the corresponding distance information according to the infrared image in the mapping table. After the distance information is obtained, the auto focus module 730 can be utilized to vary the focal length of the lens 701 so as to achieve the auto focus function.

Based on the above, in the invention, the RGB image and the infrared image can be simultaneously outputted by only implementing the single image sensor. In contrast thereto, conventionally, it is required an image sensor to capture the RGB image and then another infrared sensor to capture the infrared image. Accordingly, the invention is capable of saving cost.

It should be mentioned that, although the first image signal (B+IR), the second image signal (G+IR) and the third image signal (R+IR) in the filtering units of the color filter array 214 depicted in FIG. 4 all have the infrared image signal UR, the content for receiving infrared in each of the dyestuffs will be different. Furthermore, since the frequency spectrum is continuous, the interference can easily be caused by other wavelengths, such that the errors are generated. Therefore, another embodiment is further provided in the invention so as to increase the image quality of the output image, and the following description will be illustrated with reference to FIG. 8 and FIG. 9.

Figure 8:
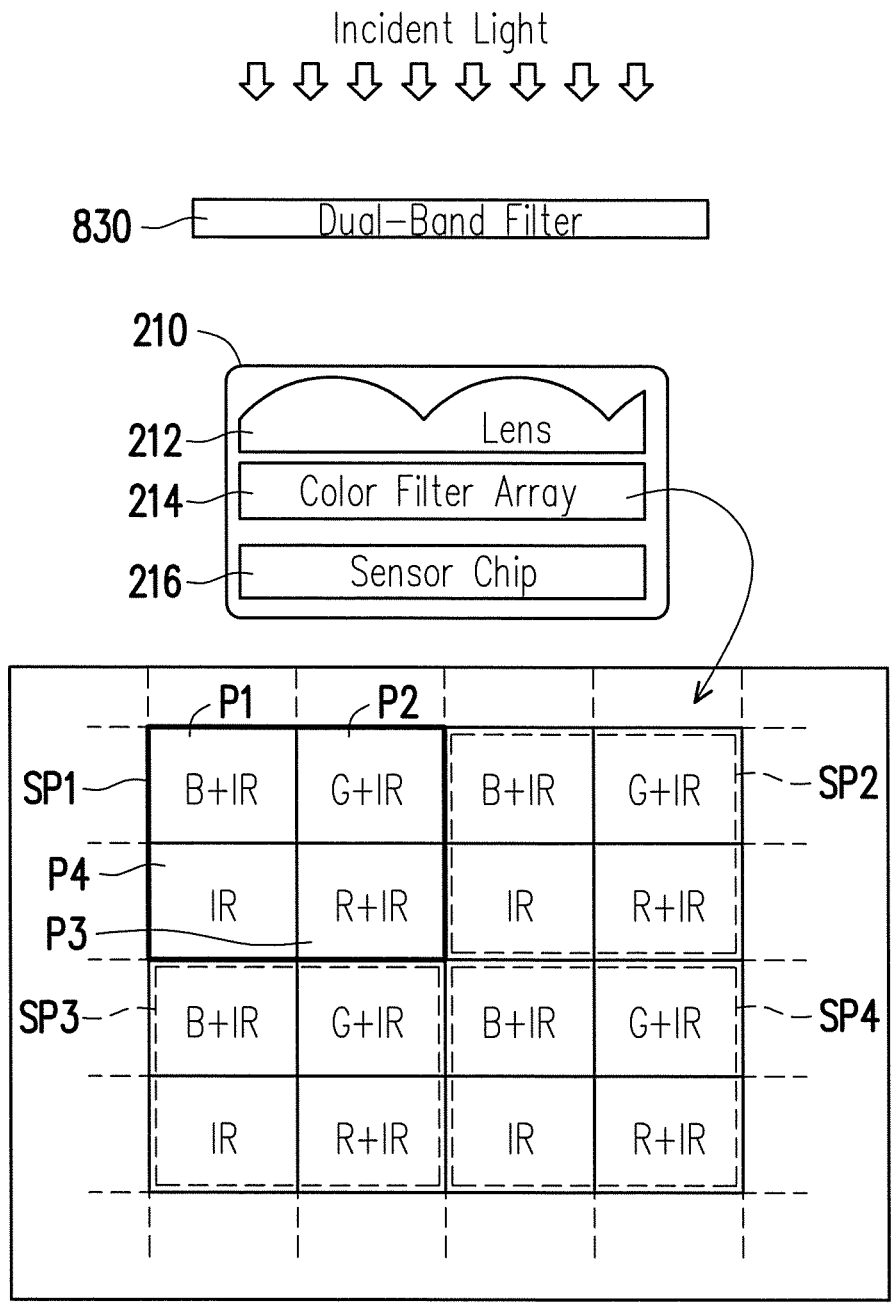
FIG. 8 is a schematic diagram illustrating an image sensor 210 which receives light and a color filter array 214 thereof according to yet another embodiment of the invention.

FIG. 8 is a schematic diagram illustrating an image sensor 210 which receives light and a color filter array 214 thereof according to yet another embodiment of the invention. The difference between the present embodiment and the embodiment depicted in FIG. 4 is, the present embodiment further includes a dual-band filter 830 disposed above the image sensor 210.

Figure 9:
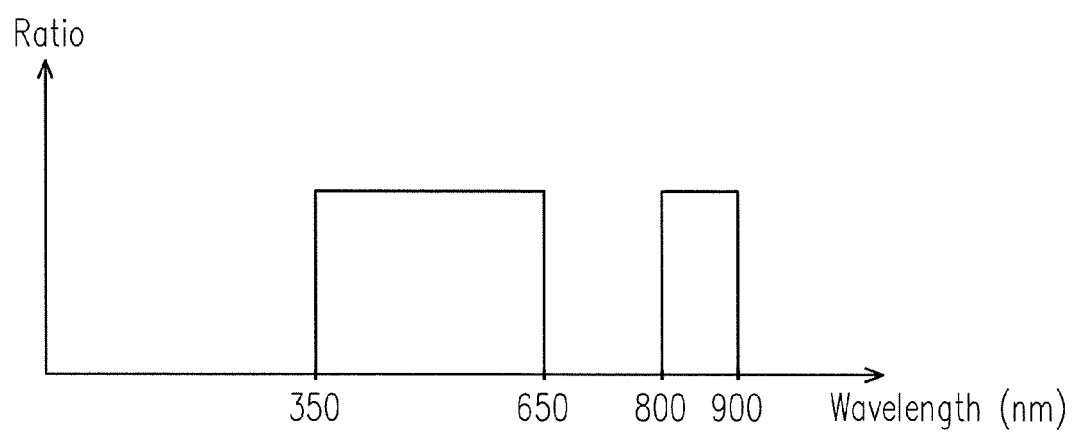
FIG. 9 is a schematic diagram illustrating ranges of frequency bands of a dual-band filter 830 according to yet another embodiment of the invention.

In order to prevent noise to interfere with each of the image signals sensed by the color filter array 214, the dual-band filter 830 is utilized to restrict the light which have wavelengths located at a first frequency band and a second frequency band to pass, and to filter out the light which have wavelengths located outside the first frequency band and the second frequency band. FIG. 9 is a schematic diagram illustrating ranges of frequency bands of a dual-band filter 830 according to yet another embodiment of the invention, in which the horizontal axis represents the wavelength, and the vertical axis represents the ratio of outputting and inputting. The first frequency band of the dual-band filter is, for instance, a wavelength located between 350 nm and 650 nm, which includes a wavelength range that the red light, the green light and the blue light are capable of passing. The second frequency band of the dual-band filter is, for instance, a wavelength located between 800 nm and 900 nm, which includes a wavelength range that the infrared light is capable of passing. In other words, only the incident light which has wavelengths located within the first frequency band and the second frequency band can enter to the image sensor 210. By contrast, the incident light which have wavelengths located outside the first frequency band and the second frequency band, can not pass due to the ratio of outputting and inputting is zero. By this way, the processor of the image capturing device can be more accurate when adjusting the infrared adjustment factor, thereby effectively enhancing the image quality. As for other details of the present embodiment, the illustration with definitions thereof being the same as the afore-described embodiments, and so further elaboration is omitted.

In view of the foregoing, in the invention, the infrared image signal can be obtained by removing the infrared cut filter and cooperating with the dyestuffs capable of sensing the infrared light in the color filter array, unlike the conventional technique has to determine whether to use the infrared cut filter due to the impact of ambient brightness. Moreover, by cooperating with the auto exposure control, the infrared adjustment factor can be set, and the proportion of the infrared image in the composite image can be adjusted. By this way, only a single image sensor is employed in the invention, which can be applied to the shooting scene, the auto focus operation or the smart sensory game etc. with the auxiliary infrared light source, thereby saving cost and enhancing the image quality.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image capturing device, comprising:
    an image sensor, configured to obtain a target image, wherein the image sensor comprises:
        a color filter array, comprising a first region permitting visible light and infrared light to pass and a second region permitting the infrared light to pass; and
        a sensor chip, obtaining the target image by the color filter array, wherein the target image comprises:
            a composite image corresponding to the first region;
            a first group infrared image corresponding to the second region, wherein the composite image is composed of a RGB image and the second group infrared image; and
    a processor, generating a processed image by employing the first group infrared image,
        wherein under a normal mode, the processor retrieves the RGB image from the composite image by employing the first group infrared image and sets the retrieved RGB image as the processed image, and
        wherein under a glimmer mode, the processor adjusts the weight of the second group infrared image in the composite image by employing the first group infrared image to generate the processed image.

2. The image capturing device according to claim 1, wherein under the glimmer mode the processor progressively increases the weight of the second group infrared image in the composite image as an ambient brightness gradually decreases.

3. The image capturing device according to claim 1, wherein under the glimmer mode, in response to an exposure time of the image sensor reaching a first predetermined value and a signal gain value of the image sensor reaching a second predetermined value, the processor linearly sets an infrared adjustment factor and thereby adjusts the weight of the second group infrared image in the composite image according to an ambient brightness by employing the first group infrared image to generate the processed image.

4. The image capturing device according to claim 1, wherein the sensor chip further comprising:
    a pixel sensor array, wherein the pixel sensor array is correspondingly disposed at a first side of the color filter array,
    wherein the color filter array comprises a plurality of filter blocks, and each of the filter blocks comprises a plurality of filtering units, the filtering units are arranged in a repeating pattern and respectively correspond to one of pixel sensors in the pixel sensor array in space, and each of the filtering units permits light with at least one frequency band to pass, so that the pixel sensor array senses the target image under a light intensity with the at least one frequency band.

5. The image capturing device according to claim 4, wherein each of the filter blocks comprises a first filtering unit, a second filtering unit, a third filtering unit and a fourth filtering unit, wherein the first filtering unit comprises a first dyestuff capable of simultaneously sensing blue light and the infrared light to obtain a first image signal, the second filtering unit comprises a second dyestuff capable of simultaneously sensing green light and the infrared light to obtain a second image signal, the third filtering unit comprises a third dyestuff capable of simultaneously sensing red light and the infrared light to obtain a third image signal, and the fourth filtering unit comprises a fourth dyestuff capable of sensing the infrared light to obtain a fourth image signal.

6. The image capturing device according to claim 1, wherein the image sensor further comprises:
    a lens, correspondingly disposed at a second side of the color filter array; and
    an auto focus module, adjusting a focus distance of the lens relative to the sensor chip,
    wherein the processor calculates the focus distance through the first group infrared image.

7. The image capturing device according to claim 1, further comprising:
    a dual-band filter, configured to filter out light, so that the light with wavelengths located at a first frequency band and/or a second frequency band pass through the color filter array of the image capturing device, wherein the first frequency band comprises a wavelength range permitting the visible light to pass, and the second frequency band comprises a wavelength range permitting the infrared light to pass.

8. An image capturing method, applicable to an image capturing device, the image capturing method comprising:
    obtaining a target image by the image capturing device, wherein the step of obtaining the target image comprises:
        receiving light by a color filter array, so that visible light and infrared light pass through a first region of the color filter array and the infrared light passes through a second region of the color filter array; and
        generating a composite image corresponding to the first region and a first group infrared image corresponding to the second region by a sensor chip, wherein the composite image is composed of a RGB image and the second group infrared image; and
    generating a processed image by employing the first group infrared image,
        wherein under a normal mode, the processor retrieves the RGB image from the composite image by employing the first group infrared image and sets the retrieved RGB image as the processed image, and
        wherein under a glimmer mode, the processor adjusts the weight of the second group infrared image in the composite image by employing the first group infrared image to generate the processed image.

9. The image capturing method according to claim 8, wherein the step of adjusting the weight of the second group infrared image in the composite image under the glimmer mode comprises:
    progressively increasing the weight of the second group infrared image in the composite image as an ambient brightness gradually decreases.

10. The image capturing method according to claim 8, wherein under the glimmer mode, the method further comprising:
    determining whether an exposure time of the image capturing device reaches a first predetermined value, and determining whether a signal gain value of the image capturing device reaches a second predetermined value; and
    linearly setting an infrared adjustment factor and thereby adjusting the weight of the second group infrared image in the composite image according to an ambient brightness by employing the first group infrared image to generate the processed image.

11. The image capturing method according to claim 8, further comprising:
    calculating a focus distance by the first group infrared image; and adjusting the focus distance of a lens relative to the sensor chip in the image capturing device, wherein the lens is correspondingly disposed at a second side of the color filter array.

12. The image capturing method according to claim 8, wherein the step of obtaining the target image by the image capturing device further comprises:

correspondingly disposing a pixel sensor array at a first side of the color filter array, wherein the color filter array comprises a plurality of filter blocks, and each of the filter blocks comprises a plurality of filtering units;

arranging the filtering units in a repeating pattern, and respectively corresponding each of the filtering units to one of pixel sensors in the pixel sensor array in space, wherein each of the filtering units permits the light with at least one frequency band to pass; and sensing the target image by the pixel sensor array under a light intensity with the at least one frequency band.

13. The image capturing method according to claim 8, wherein the step of obtaining the target image by the image capturing device further comprises:

filtering the light by a dual-band filter, so that the light with wavelengths located at a first frequency band and/or a second frequency band pass through the color filter array of the image capturing device, wherein the first frequency band comprises a wavelength range permitting the visible light to pass, and the second frequency band comprises a wavelength range permitting the infrared light to pass.

* * * * *